Jan. 30, 1968 E. WALLERSTEIN 3,366,731
TELEVISION DISTRIBUTION SYSTEM PERMITTING PROGRAM
SUBSTITUTION FOR SELECTED VIEWERS
Filed Aug. 11, 1967
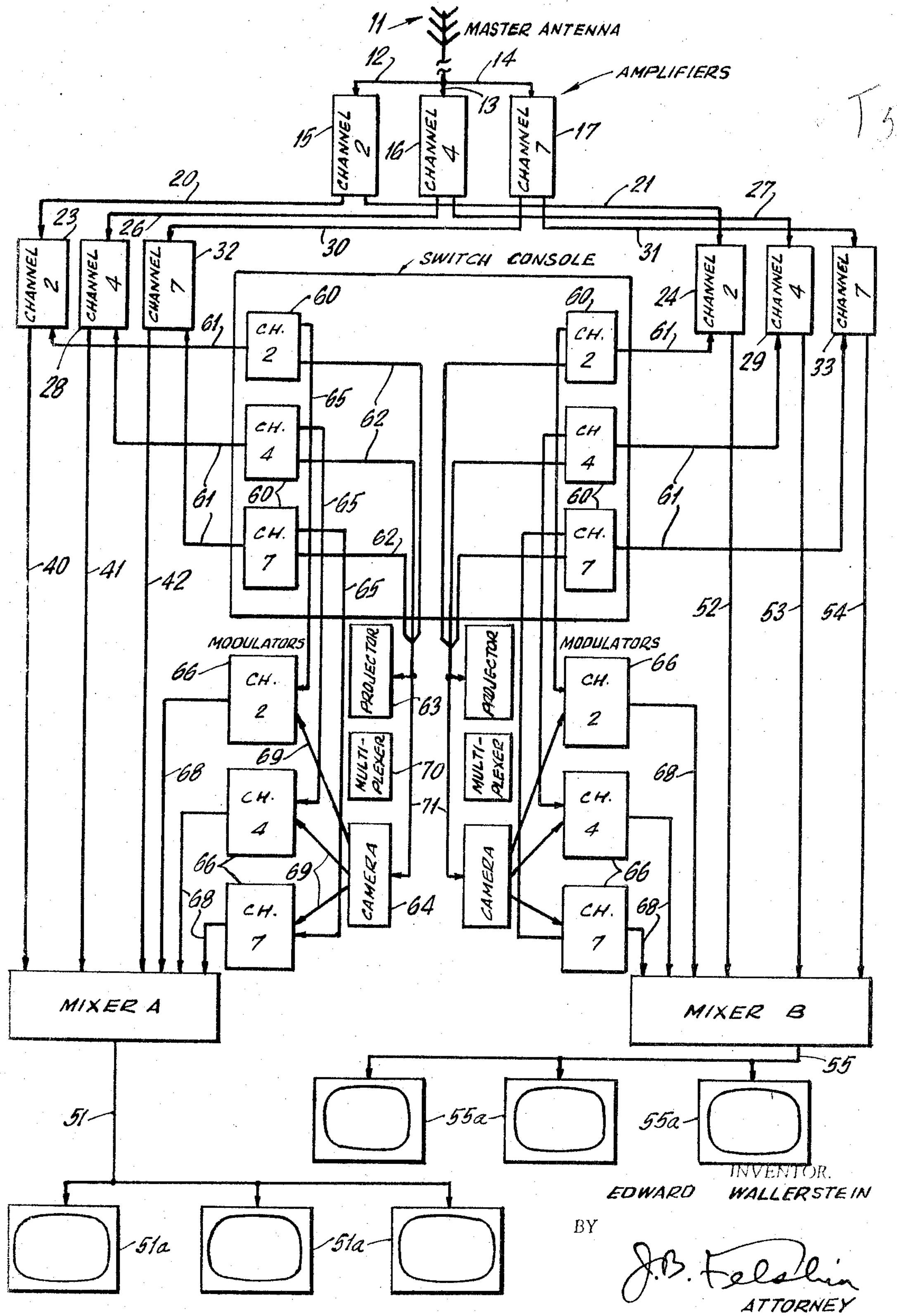
T5003
Rm
INVENTOR.
EDWARD WALLERSTEIN
BY
J.B. Felshin
ATTORNEY United States Patent Office 3,366,731

Patented Jan. 30, 1968

3,366,731
TELEVISION DISTRIBUTION SYSTEM PERMITTING PROGRAM SUBSTITUTION FOR SELECTED VIEWERS

Edward Wallerstein, New York, N.Y. (% Communication and Media Research Services, Inc., 527 Lexington Ave., New York, N.Y. 10017)

Continuation-in-part of application Ser. No. 341,841, Jan. 29, 1964. This application Aug. 11, 1967, Ser. No. 666,536

8 Claims. (Cl. 178—6)

ABSTRACT OF THE DISCLOSURE

Apparatus and method of receiving television signals through a master television antenna, transferring such signals, via coaxial cables, to a plurality of amplifiers, each capable of receiving and amplifying signals of a different television channel, then transferring the signals from each amplifier via cables, to a pair or more of single channel amplifiers, with one single channel amplifier of each pair comprising a set of single channel amplifiers, a mixer being provided for each set of single channel amplifiers, then alternately either transferring signals from any single channel amplifier of each set by a cable to its mixer or blocking the signals from said single channel amplifier to its mixer and substituting a different television signal therefore to its mixer, and transferring signals via cable from each mixer to a different set of television receivers.

This application is a continuation-in-part of my application Ser. No. 341,841, filed Jan. 29, 1964, and now abandoned for "Split Cable Television Commuication."

BRIEF SUMMARY OF THE INVENTION

The present invention is essentially a method of and apparatus for simultaneously transmitting multiple television signals over the same television channel in a given community. It represents an important advance in the art of:

(1) Communicating to audiences via television, (2) Differentiating between their responses to various television signals, such as commercials or shows, and (3) Measuring the relative effectiveness of television response as compared to response to other media such as newspapers, magazines and radio in terms of the sales of a given product.

Split cable television testing utilizes a community antenna system for its operation.

A community antenna system works in the following manner:

A large television antenna tower is erected on the outskirts of a community which receives television signals coming over the air.

These signals are transmitted by means of a coaxial cable to a broadcast control station. At the broadcast control station the signal is amplified and modulated to proper strength and transmitted by cable lines to the homes in the given community.

In the case of the split cable television testing procedure, two or more cable systems emanate from the broadcast control station to the homes in the community. The distribution of these wired systems may be:

(a) *Geographical.*—That is, each graphic section of the community will be connected to a different cable attached to the broadcast control station. The community can be divided into as many geographic segments as desired.

(b) *Alternate households.*—Here each of the wired systems from the broadcast control station goes around the entire town. Homes are attached alternately to wire, 1, 2, 3 or 4, or any other multiple of wires. Thus, taking a series of four adjacent households, each household may be on a different wired system.

Utilizing either of these procedures, the broadcasting control station, by means of switches, alternate modulators, cameras and multiplexers and other equipment, can control the television signals going into the specific homes in the community.

The original signal coming over the air from any channel can be transmitted intact to the entire community or the signal from any channel can be removed from any segments of the community and a substitute signal inserted.

The signal may be in the form of one or a multiple of commercials or programs.

Thus, it is possible to simultaneously communicate different signals over the same channel to different segments of the community, either on a geographic or alternate household basis.

This procedure permits measurements over time of the effectiveness or response to different stimuli, either in terms of commercials or programs, by different segments of the population.

Thus, for the first time it is now possible, using this system, to isolate the factor of television in determining attitudinal and behavioral changes.

In a community antenna system, attenuated television signals are received by a master antenna, then conveyed through single channel filters and single channel amplifiers. The output of each of the amplifiers is then combined into a mixer and the combined signals inserted into a master cable line for distribution throughout the community.

The split cable system alters the above pattern in the following manner:

A. *Dividing the community antenna television system into a plurality of segments*

Each of the television signals received by the master antenna is directed to a plurality of single channel amplifiers. The number of single channel amplifiers employed in any split cable system corresponds to the number of channels carried and the number of cable segments desired.

Thus, if a community antenna television system carries 12 channels, and 2 cable segments are desired, then each one of the 12 channel signals carried will be directed to 2 single channel amplifiers, or a total of 24, arranged in 2 sets of 12.

Up to this point, each of the pairs of amplifiers for the same channel carries the same signal. Each set of 12 amplifiers will comprise one cable segment.

The output of each single channel amplifier, comprising the set, is directed to a mixer which combines the individual channel signals and conveys them to a coaxial cable.

The output of each mixer is directed to a cable segment which, in turn, is directed to a section of the community being served by the community antenna television system.

In addition, the community antenna television system cable lines are rearranged so as to divide the community into a plurality of segments, each served by the output of an independent mixer.

B. *Blocking and substituting of signals*

The existence of a plurality of cable segments thus makes possible the blocking and substituting of television signals on any channel(s) in any segment(s) in the following manner:

For each channel carried in each cable segment, a switch is installed on a control panel which:

(1) Cuts off the power supply (B+) from the single channel amplifier feeding into that cable segment. This instantly blocks that signal from entering the mixer for that cable segment.

(2) Simultaneously activates a projector which feeds into a multiplexer, television camera and modulator. The television signal thus created is then converted to the identical channel frequency as the signal blocked. The substituted signal is then fed into the appropriate mixer.

The substituted signal may be generated from film, live programming or video tape.

The same or different substituted signals may be inserted into one or more cable segments simultaneously.

Other objects of this invention will in part be obvious and in part hereinafter pointed out.

The invention accordingly consists in the steps, features of construction, combinations of elements, and arrangement of parts which will be exemplified in the construction and method hereinafter described, and of which the scope of invention will be indicated in the following claims.

BRIEF DESCRIPTION OF THE DRAWING

In the accompanying drawing, in which is shown an illustrative embodiment of this invention:

The single figure of the drawing is a wiring diagram illustrating the invention.

DETAILED DESCRIPTION OF THE INVENTION

Referring now to the drawing, 10 designates a system or apparatus embodying the invention shown in the drawing in the form of a wiring diagram.

The system 10 comprises a master antenna 11 connected by coaxial cables 12, 13, 14 to amplifiers 15, 16, 17, respectively, each for a different television channel. The amplifier 15 is for channel 2, amplifier 16 for channel 4, and amplifier 17 for channel 7. This is by way of illustration. There may be any suitable number of such amplifiers for any suitable number of channels. The amplifiers 15, 16, 17 are connected by split cables 20, 26, 30 and 21, 27, 31 to a plurality of sets of single channel amplifiers 23, 28, 32 and 24, 29, 33. Amplifiers 23 and 24 are channel 2 amplifiers. Although only two single channel amplifiers are shown for purpose of illustration, any number may be employed. Single channel amplifiers 28, 29 comprise channel 4 amplifiers. Single channel amplifiers 32, 33 are channel 7 amplifiers. It will be understood that instead of the amplifiers 15, 16 and 17 being connected only to a pair of sets of single channel amplifiers, they may be connected to any number of sets, only one pair of single channel amplifiers being shown for purpose of illustration.

The single channel amplifiers 23, 28 and 32 are connected by cables 40, 41 and 42 to a mixer A. The mixer A is connected by coaxial cable 51 to a group of television receivers **51*a***.

The single channel amplifiers 24, 29, 33 are connected by cables 52, 53, 54, respectively, to mixer B. Mixer B is connected by coaxial cable 55 to a different group of television receivers **55*a*. The set of receivers 55*a* are independent of the television receivers 51*a***. Each set of receivers may be located in a different neighborhood or mixed up in the same neighborhood, as desired. It will be understood, of course, that if there are more than two sets of single channel amplifiers, each set is connected to a separate mixer and that mixer is connected by coaxial cable to a different set of television receivers.

In an ordinary community, an antenna system would comprise a master antenna 11, the amplifiers 15, 16 and 17 for the different channels, a single set of single channel amplifiers, such as 23, 28, 32 with their connections to their mixer and the connections from the mixer to a set of television receivers (which would ordinarily be spread out throughout the community). With such a system the television signals are all transferred to all the television receivers.

In accordance with the present invention means is provided to block the signal from one or more single channel amplifiers of one or more sets, and to substitute a different signal therefor to be transferred to its mixer and from there transferred to the group of television receivers connected to the mixer. To this end, there is associated with each of the single channel amplifiers of each set, a three pole, two position switch 60. Normally, power passes through switches 60 through wires 61 to their respective single channel amplifiers 23, 28, 32 or 24, 29, 33. Power passing through wire 61 to each single channel amplifier is necessary for the amplifier to operate to pass signals through their respective wires 40, 41, 42 or 52, 53, 54 to the mixer A or mixer B, as the case may be. Associated with each switch 60 are a pair of normally open contacts. One normally open contact of the switches 60 associated with one set of single channel amplifiers is connected by wires 62 to a projector 63 and camera 64. The other normally open contact of each switch 60 is connected by wire 65 to a modulator 66. One modulator 66 is provided for each channel. There are, of course, modulators 66 associated with each of the switches 60 for each set of single channel amplifiers. The modulators 66 associated with each set of single channel amplifiers are connected by cables 68 to the mixer associated with said set. Thus wire 68 connects one set of modulators 66 to the mixer A and another set of modulators 66 are connected by cable 68 to the mixer B.

The camera 64 associated with each set of single channel amplifiers is connected by wires or cables 69 to all the modulators of the associated set. A multiplexer 70 may be associated between each projector 63 and its associated camera 64. The multiplexers 70 are of usual construction and comprise a series of lenses to concentrate light. These may be omitted if desired. The television cameras 64 create a signal. The modulators put the signals into desired frequency for the selected channel. Each projector 63 and associated camera 64 and multiplexer 70 may be in one unit.

Film may be provided for the projectors and the images fed into the cameras. Thus the projectors and cameras may be connected by wiring 71. However, the cameras may be trained on live shows if desired. Also, video-tape can take the place of the cameras, projectors and multiplexers if desired as is well known.

It will thus be seen that there is provided an apparatus and method in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

I claim:

1. A process comprising receiving television signals, transferring the received signals to a plurality of sets of corresponding single channel amplifiers with the single channel amplifiers of each set receiving signals in different television channels, transferring said signals from one or more of said single channel amplifiers of each set to a mixer for said set, selectively blocking the signals from one or more of the single channel amplifiers of one or more sets of said amplifiers, and substituting for the blocked signals, different signals but in frequencies corresponding to the frequencies of the blocked signals, transferring said substituted signals to respective mixers associated with the set of single channel amplifiers signals of which are blocked, and then transferring the substituted signals from each mixer to different groups of television receivers, each group associated with one of said mixers.

2. The process of claim 1, wherein the received television signals are received from a master television antenna.

3. The process of claim 2, wherein the received television signals are transferred from the master television antenna to said plurality of sets of single channel amplifiers by means of split cables.

4. The process of claim 1, wherein said substituted signals are passed to the mixers by means of modulators.

5. The process of claim 1, wherein the substitution of signals is accomplished by means of switches which simultaneously block a signal and substitute a signal therefore.

6. In combination, a plurality of sets of single channel amplifiers of corresponding channel frequencies, means to feed television signals thereto, a mixer for each set, means to transfer signals from the amplifiers of each set to its mixer, a group of television receivers for each mixer, means to transfer signals from each mixer to the group of television receivers associated therewith, and means to block signals from one or more amplifiers of one or more sets, to the associated mixers and to substitute different signals for the blocked signals in the frequencies of said blocked signals for transference to said groups of receivers.

7. The combination of claim 6, the means to feed signals to said sets of single channel amplifiers comprising split cables.

8. The combination of claim 7, the means for substituting signals to said mixers, comprising means to simultaneously block signals and substitute signals therefor.

References Cited

UNITED STATES PATENTS

| | | | |
|---|---|---|---|
| 2,229,044 | 1/1941 | Butler | 325—308 |
| 2,545,259 | 3/1951 | Cassell | 325—308 |
| 3,180,938 | 4/1965 | Glomb | 179—15 |

ROBERT L. GRIFFIN, *Primary Examiner.*

H. W. BRITTON, *Assistant Examiner.*